United States Patent

Hille et al.

Patent Number: 5,412,023
Date of Patent: May 2, 1995

[54] AQUEOUS DISPERSIONS OF CROSS-LINKED POLYMER MICROPARTICLES

[75] Inventors: Hans-Dieter Hille, Bergisch-Gladbach; Matthias Massone, Köln, both of Germany

[73] Assignee: Bollig & Kemper KG, Köln, Germany

[21] Appl. No.: 910,080

[22] PCT Filed: Dec. 4, 1990

[86] PCT No.: PCT/EP90/02096

§ 371 Date: Jul. 10, 1992

§ 102(e) Date: Jul. 10, 1992

[87] PCT Pub. No.: WO91/08269

PCT Pub. Date: Jun. 13, 1991

[30] Foreign Application Priority Data

Dec. 6, 1989 [DE] Germany ............... 39 40 316.5

[51] Int. Cl.⁶ ............... C08L 51/00; C08L 61/00
[52] U.S. Cl. ................... 524/539; 524/542
[58] Field of Search ............... 524/501, 539, 542

[56] References Cited

U.S. PATENT DOCUMENTS

| | | | |
|---|---|---|---|
| 3,133,032 | 5/1964 | Jen et al. | 524/598 |
| 3,870,684 | 3/1975 | Witt et al. | 524/591 |
| 4,293,679 | 10/1981 | Cogliano | 528/48 |
| 4,408,008 | 10/1983 | Markusch | 524/591 |
| 4,507,431 | 3/1985 | Stutz et al. | 524/512 |
| 4,525,520 | 6/1985 | Shioi et al. | 524/510 |
| 4,783,497 | 11/1988 | Thompson | 524/542 |
| 4,942,198 | 7/1990 | Dickerhof et al. | 524/510 |
| 4,945,128 | 7/1990 | Hille et al. | 524/591 |
| 5,043,380 | 8/1991 | Cole | 524/510 |
| 5,075,372 | 12/1991 | Hille et al. | 524/839 |
| 5,200,461 | 4/1993 | Tsuchiya et al. | 524/510 |

FOREIGN PATENT DOCUMENTS

| | | |
|---|---|---|
| 0038127A1 | 10/1981 | European Pat. Off. . |
| 0103174A2 | 3/1984 | European Pat. Off. . |
| 0193517A2 | 9/1986 | European Pat. Off. . |
| 0272500A2 | 6/1988 | European Pat. Off. . |
| 0276655A2 | 8/1988 | European Pat. Off. . |
| 0320689A2 | 6/1989 | European Pat. Off. . |
| 3606512A1 | 9/1987 | Germany . |
| 3606513A1 | 9/1987 | Germany . |
| 2218426 | 11/1989 | United Kingdom . |

*Primary Examiner*—Kriellion S. Morgan
*Attorney, Agent, or Firm*—Fish & Richardson

[57] ABSTRACT

The invention relates to aqueous dispersions of cross-linked polymer microparticles, prepared in an aqueous medium from a polymer, optionally dissolved in an organic solvent, said polymer bearing at least two hydroxyl groups and comprising a number of ionic groups sufficient for the formation of a stable aqueous dispersion, as the component (A) and one further component (B) at an elevated temperature, characterized in that component (A) is a polyesterpolyol, a polyurethane or a polyacrylate having an acid value of from 5 to 168, and that component (B) is an aminoplast resin consisting of molecules containing at least two reactive groups consisting of hydroxyl and/or amino and/or ether groups, that the ratio by weight of component (A) to component (B) is between 30:70 and 95:5, and that the dispersion is stable and usable in water and/or an organic solvent or mixtures thereof. The invention further relates to a process for producing these dispersions, the use thereof and coating compositions containing said dispersions.

13 Claims, No Drawings

AQUEOUS DISPERSIONS OF CROSS-LINKED POLYMER MICROPARTICLES

The invention relates to aqueous dispersions of cross-linked polymer microparticles, the use thereof, a process for producing same and coating compositions containing said dispersions.

It is generally desirable to reduce the proportion of organic solvents in coating compositions.

There is great interest in aqueous lacquer systems, and especially so in the field of automotive painting, but also in other areas.

The use of aqueous lacquer systems involves a number of problems associated with the chemical and physical properties of water. Thus, e.g., the rheology (course of the viscosity during application, pseudo-plasticity, thixotropy, levelling and run-off properties) of conventional lacquer systems is to be purposefully controlled by relatively simple means via the evaporation behavior of the employed organic solvents or solvent mixtures, respectively. These possibilities can be utilized in aqueous systems either to a much restricted extent or even not at all.

However, a control of the rheologic properties of the coating compositions employed is of an extraordinarily high importance in the production of high-quality multilayer coatings, and especially of coatings exhibiting a metallic effect.

Thus, e.g., a steep viscosity rise after the application has a very beneficial effect onto the orientation and fixation of the metal pigment particles in metallic effect base coating.

What gives rise to problems, however, is the compatibility with the aqueous binder systems of the metal pigment particles, since, especially when aluminum particles are used as the metal pigment, the metal is amphoteric and is readily attacked with concomitant hydrogen evolution.

But also in other coating procedures, and more particularly so in the case of coatings deposited by spray applications, the quality of the resulting coatings to a high degree depends on the rheologic properties of the coating compositions employed.

It has been known that the rheologic properties of aqueous coating compositions can be affected by the addition of cross-linked polymer microparticles.

EP-A-0 038 127 describes a process for producing a multilayer coating on a substrate surface, wherein the base coat composition is derived from a dispersion of cross-linked polymer microparticles, said dispersion having been prepared in an aqueous medium. The polymer microparticles consisting of polymers of alkyl esters of acrylic or methacrylic acids were prepared therein by dispersion polymerization in water and one further organic solvent in the presence of a certain polymeric stabilizer.

EP-A-0 320 689 describes a stable non-aqueous dispersion of microparticles, prepared from an aminoplast resin and a material containing OH groups in a preferably non-polar solvent in the presence of an organic sulfonic acid and a stabilizer.

EP-A-0 103 174 describes a process for the production of aqueous dispersions of cross-linked polyurethane ionomers by the reaction with polyfunctional compounds of prepolymers bearing isocyanate groups. Said process is characterized in that polyurethane prepolymers containing incorporated salt groups and having aliphatically and/or cycloaliphatically bonded terminal isocyanate groups are mixed with polyfunctional polyisocyanates in a water-miscible organic solvent, the resulting solution is dispersed in water, and the organic solvent is evaporated.

U.S. Pat. Nos. 4,408,008 and 4,293,679 also describe a process for the production of polymer microparticles from polyisocyanate; however, said printed publications fail to contain any reference to that the dispersions disclosed therein are capable of being employed in aqueous coating systems.

In principle, all of these processes are based on two different methods or particle formation:

(1) Particles wherein polymerization is intitated are produced with water-insoluble monomers by means of surfactants which will form micelles above some definite concentration. This process of an emulsion polymerization has already been known for a long time and is used on a commercial large scale for the production of a great variety of plastics dispersions. In order to obtain cross-linked particles, monomers are employed which contain more than one polymerizable double bond. However, this method is only capable of providing polymers, the chains of which do exclusively consist of carbon-carbon bonds. Controlled modifications can be achieved only on the pendant chains by selecting appropriate monomers. Another drawback of these processed resides in the fact that the use of surfactants is indispensable for accomplishing a particle formation. The surfactants capable of forming micelles are water-soluble low molecular weight substances which, moreover, are electrolytes. Since they cannot be removed from the dispersions, they often involve further disadvantages, such as, for example, in the sensitivity to water and in the swelling property.

(2) A polymer is prepared in an organic phase, which polymer contains ionic groups and, hence, when transferred into water, spontaneously forms particles, the size of which will depend on the contents of ionic groups. The particles are converted into a cross-linked state by incorporation of definite functional groups and by an addition of appropriate polyfunctional reactants. However, only a very few reactions have been known which proceed in the aqueous phase below the boiling temperature of water without deteriorating the stabilization system of the dispersion. Ionically stabilized dispersions will change their stability state upon an addition of electrolytes, acids and bases. This means that an addition of acids as well as of bases will cause great changes to occur in the properties of a dispersion, which may even result in a full coagulation, dependently on the polarity.

U.S. Pat. No. 3,870,684 describes attempts to produce dispersions of cross-linked polymer microparticles containing urea groups, in which attempts polyurethane ionomers dispersed in an aqueous phase and comprising terminal isocyanate groups are cross-linked with polyamines. However, this process results in a formation of just unstable settling dispersions.

In DE-OS 36 06 512 and in DE-OS 36 06 513 there has been described a process wherein water-soluble polyester resins are reacted with polyisocyanates in an aqueous phase to form cross-linked particles. This process has the inherent drawback of that it is very sensitive and difficult to reproduce.

Thus, it was the object of the present invention to produce stable, and preferably aqueous, dispersions of cross-linked polymer from readily available starting components by means of a process to be carried out as easily as possible, the properties of which microparticles can be optimally adjusted to a broad variety of possible uses, especially in formulating coating compositions.

It has been surprisingly found that aqueous dispersions of cross-linked polymer particles can be produced by dissolving a polymer bearing both anionic groups, preferably carboxylate groups, and hydroxyl groups with an aminoplast resin in a completely or partially water-miscible organic solvent, transferring said solution into water and allowing the mixture to react at temperatures between 50° C. and 100° C., and subsequently distilling off the organic solvents. This finding is a surprise, since it was to be expected that the cross-linking reaction cannot proceed in an aqueous system at pH values of above 7 at temperatures below 100° C. in the absence of a catalysis effected by a strong acid. Acids would cause anionically stabilized dispersions to coagulate.

Moreover, it has been surprisingly found that metal pigment particles, and especially aluminum pigment particles, are not attacked to evolve hydrogen upon the use of the dispersion according to the invention as a rheology aid and/or binder component.

According to the invention, the object as set forth above is attained by aqueous dispersions of cross-linked polymer microparticles, prepared in an aqueous medium from a polymer, optionally dissolved in an organic solvent, said polymer bearing at least two hydroxyl groups and comprising a number of ionic groups sufficient for the formation of a stable aqueous dispersion, as the component (A) and one further component (B) at an elevated temperature, characterized in that component (A) is a polyesterpolyol, a polyurethane or a polyacrylate having an acid value of from 10 to 100, and that component (B) is an aminoplast resin consisting of molecules containing at least two reactive groups consisting of hydroxyl and/or amino and/or ether groups, that the ratio by weight of component (A) to component (B) is between 30:70 and 95:5, and that the dispersion in water and/or an organic solvent or mixtures is stable and applicable.

The process according to the invention is carried out in two steps. The first step consists in the preparation of the component CA), a polymer containing hydroxyl groups and, in addition, containing a quantity of acid groups sufficient to form stable dispersions in water.

According to the invention there are especially employed polyesterpolyols, polyurethanes or polyacrylates.

The determination of the optimum concentration, for forming a stable aqueous dispersion, of the ionic groups in the component (A) is readily practicable by an average artisan by means of simple routine tests. The concentration of ionic groups as usually required for the formation of a stable dispersion is between 0.1 and 3 milliequivalents per 1 g of component (A).

Neutralization with bases of groups capable of forming salts is preferably effected shortly before dispersing or during dispersing the mixture consisting of the components (A) and (B) in the aqueous dispersing medium, in which the organic solvent or solvent mixture of the component (A) is contained.

The groups capable of forming salts, above all, may be carboxylic acid or sulfonic acid groups. These groups are preferably neutralized with an amine.

Amines suitable for the neutralization of the groups capable of forming anions are, more specifically, tertiary amines, such as trimethylamine, triethylamine, dimethylaniline, diethylaniline, triphenylamine, morpholine derivatives and, quite particularly preferred, tertiary amines containing hydroxyl groups such as N,N-dimethylethanolamine.

The contents of ionic groups as adjusted by a controlled neutralization of groups suitable to form salts is an important parameter, by means of which the size of the resulting cross-linked polymer microparticles can be controlled.

Component (A) preferably consists of one or more polyesterpolyol(s) containing at least two hydroxyl groups.

Examples of suitable polyesterpolyols are the per se known reaction products of polyhydric polyols with polycarboxylic acids and/or polycarboxylic acid anhydrides.

Polyols suitable for preparing the polyesterpolyols are, e.g., ethylene glycol, 1,2- and 1,3-propanediol, 1,3- and 1,4-butanediol, the isomeric pentanediols, hexanediols or octanediols (e.g., 2-ethyl-1,3-hexanediol), trimethylolpropane, neopentyl glycol, glycerol, bishydroxymethyl cyclohexane, erythritol, mesoerythritol, arabitol, adonitol, xylitol, mannitol, sorbitol, dulcitol, hexanetriol or (poly-)pentaerythritol.

The polycarboxylic acids suitable for the preparation of the polyesterpolyols principally consist of lower molecular weight polycarboxylic acids, or the anhydrides thereof as far as these anhydrides do exist, having from 2 to 18 carbon atoms in the molecule. Di- and tricarboxylic acids are preferred to be used. The polycarboxylic acids and/or the anhydrides may be used individually or in admixture.

Suitable carboxylic acids are, for example, oxalic acid, succinic acid, fumaric acid, phthalic acid, isophthalic acid, terephthalic acid, tetrahydrophthalic acid, hexahydrophthalic acid, adipic acid, azelaic acid, sebacic acid, maleic acid, glutaric acid, hexachloroheptanedicarboxylic acid, tetrachlorophthalic acid and trimellitic acid. Also suitable are various fatty acids such as, e.g., soybean fatty acid, isononaoic acid etc. In the place of said acids there may also be employed the anhydrids as far as these do exist. As the component (A) there may also be employed polyesterpolyols prepared by the polymerization of lactones.

Component (A) is selected so that the acid value thereof is between 5 and 168, and preferably between 20 and 50.

In most cases it will be required, for purposes of handling, to dissolve the component (A) (prepolymer) in an organic solvent or solvent mixture. As the solvent there may be selected, more particularly, those which are volatile so that they can be subsequently removed by distillation from the aqueous dispersion. Especially suitable are here acetone, methylethylketone, methylisobutylketone, methylamylketone, dimethoxyethane, tetrahydrofurane, dioxane or mixtures thereof. Larger amounts of solvents containing hydroxyl groups may have disadvantageous effects. As the component (A) there may also be employed mixtures with polymers bearing only OH groups. The ratio may be readily determined by an average artisan.

As the component (B), in principle there may be used all aminoplast resins which are suitable to be used in combination with resins bearing hydroxyl groups (components (A)) as baking enamels. Water-soluble types may also be used besides the water-insoluble types which are preferred to be used. Melamine resins and modified melamine resins possessing at least two reactive groups per molecule have proven to be particularly useful besides other aminoplasts. Said reactive groups are understood to mean, more specifically, hydroxyl groups and/or amino groups and/or ether groups (melamine methylol compounds).

The process for preparing the cross-linked polymer microparticles is carried out by first mixing the component (A) in an organic solvent with the component (B). The mixing ratio of the component (A) to the component (B) may be between 30:70 and 95:5, and preferably between 60:40 and 80:20 and will especially depend on the intended use of the dispersion. This mixture is transferred into the aqueous phase by first converting the acid groups into anions by neutralization with a water-soluble base. Thereupon, the particle size decreases with the increase in the degree of neutralization. However, it does not make much sense to exceed a degree of neutralization of 100%, since the cross-linking reaction is retarded at higher pH values. On the other hand, however, it should be taken into consideration that the stability of the dispersion can be deteriorated, if the degree of neutralization employed is too low. However, the artisan will be readily able by means of preliminary tests to determine a suitable degree of neutralization of a system. It is often advantageous to add the neutralizing agent as an aqueous solution.

The solids content in the course of the cross-linking reaction is to be selected so that the viscosity does not adversely affect the stirrability. However, the viscosity decreases while cross-linking proceeds, so that the reaction may be begun at the lower stirrability limit. The progress of the reaction may be monitored by way of the development of the viscosity, measured in a predominantly organic medium. The viscosity initially increases with an increase in the molecular weight to reach a maximum, and then it drops again with an increase in the content of cross-linked particles. From this time it is noticeable that the organic medium turns turbid. Hence, the reaction is completed as soon as the viscosity in the predominantly organic medium does no longer drop and the turbidity is no longer enhanced. Nevertheless, the reaction may be prematurely stopped at each point by cooling. The reaction temperature at which the cross-linking reactions can be carried out is between 50° C. and 100° C., and preferably between 70° C. and 90° C.. However, it is as well possible any time to carry out the reaction at higher temperatures and under an elevated pressure. Upon completion of the reaction, the resulting dispersion is neutralized with the amine or an aqueous solution of the amine to 100%, and the organic solvent or solvent mixture as still present is distilled off. As the case may be, this may require the application of a vacuum.

The aqueous dispersions thus obtained are distinguished by a high stability and a solids content of from 10 to 50% by weight, and preferably of from 30 to 40% by weight.

The polymer particles thus obtained may also be transferred into non-aqueous dispersions, e.g. according to EP-A-29 637.

In order to transfer the cross-linked polymer microparticles into an organic phase, the resulting dispersion is mixed with an alcohol (e.g. butanol), an organic solvent (e.g. xylene) and optionally water. By the addition of a suitable acid (e.g. maleic acid) or of an aqueous solution thereof the acid groups are subjected to a reprotonation, which leads to a destruction of the stabilizing system and, thereby, to a coagulation. After the separation of the organic phase and the removal of the residual water from the organic phase by a vacuum distillation there is obtained a non-aqueous stable dispersion, which is highly viscous by room temperature, of cross-linked polymer microparticles in an organic solvent.

The invention further relates to the use of the dispersions, and especially of the aqueous dispersions, as rheology agents and binder components in lacquers, and preferably in metallic effect laquers.

Surprisingly, it has been determined here that upon the use of the dispersions according to the invention there is no danger of a formation of hydrogen and of a dissolution of the metal pigment particles. More particularly, this relates to amphoteric metals such as, for example, aluminum or aluminum alloys (e.g. aluminum bronze) which may be added to the lacquers as a metal pigment to achieve a metallic effect. When the dispersions according to the invention are used, any hydrogen evolution does not occur in the lacquers, although the pH value of the dispersions (pH≧8) would be suitable for allowing the aluminum particles to be attacked to evolve hydrogen.

The invention further relates to coating compositions consisting of a dispersion of cross-linked polymer microparticles, prepared in water from a polymer, optionally dissolved in an organic solvent, said polymer bearing at least two hydroxyl groups and comprising a number of ionic groups sufficient for the formation of a stable aqueous dispersion, as the component (A) and one further component (B) at an elevated temperature, in a medium which may contain still further film-forming material, pigments and further conventional additives and is particularly suitable for producing protective and/or decorative coatings, said dispersion being characterized in that component (A) is a polyesterpolyol, a polyurethane or a polyacrylate having an acid value of from 10 to 100, and that component (B) is an aminoplast resin consisting of molecules containing at least two reactive groups. These reactive groups are hydroxyl and/or amino and/or ether groups. In the dispersion, the ratio by weight of component (A) to component (B) is between 30:70 and 95:5. The dispersion itself in water and/or an organic solvent or mixtures is stable and applicable.

The above-described coating compositions are preferably used in processes for making multilayer coatings on substrate surfaces, wherein (1) an aqueous dispersion is applied as the base coating composition,
(2) a polymer film is formed on the substrate surface from the composition applied in step (1),
(3) a suitable transparent cover layer composition is applied onto the base layer thus obtained, and subsequently
(4) the base layer is baked together with the cover layer.

As the cover layer compositions, there are basically suitable any known coating compositions which contain no pigment at all or only transparent pigment. These may be conventional solvent-containing varnishes, water-dilutable varnishes or powder varnishes.

The substrates to be coated include mainly pretreated metal substrates; however, untreated metals and any optional other substrates such as, e.g., wood or plastics, may also be coated with a protective and/or decorative multilayer coating by using the base coating compositions according to the invention.

The invention is further illustrated in the following Examples, however without being restricted thereto.

EXAMPLES

In the following Examples, all quantities are given by weight. The viscosity was measured at 20° C. in a DIN beaker (4 mm). The water employed was fully de-salted water.

I.

Preparation of Polyesterpolyols (Component (A))

Example 1

In a four-necked flask equipped with stirrer, a thermometer and a packed column, 1911.6 parts of 1,6-hexanediol together with 525.6 parts of adipic acid are caused to melt. Then 896.4 parts of isophthalic acid are added to the stirred mixture, and the temperature is raised so that the column head temperature will not exceed 100° C. The esterification is continued at a maximum temperature of the reaction mixture of 220° C. until an acid value of 3 is reached. After the mixture has been cooled to 170° C., 691.2 parts of trimellitic acid anhydride are added, and the esterification is continued at 170° C. until an acid value of 28 is reached. After the mixture has been cooled to 100° C., 1200 parts of methylisobutylketone are added. The resulting polyester resin solution has a solids content of 75%.

Example 2

In an apparatus according to Example 1,670 parts of trimethylolpropane, 354 parts of 1,6-hexanediol, 1400 parts of an isomerized soybean fatty acid and 592 parts of phthalic acid anhydride are caused to melt. Then the temperature of the stirred mixture is raised so that the column head temperature will not exceed 100° C. The esterification is continued at a maximum temperature of the reaction mixture of 220° C. until an acid value of 3 is reached. After the mixture has been cooled to 170° C., 384 parts of trimellitic acid anhydride are added, and the esterification is continued at 170° C. until an acid value of 34 is reached. After the mixture has been cooled to 110° C., 1076 parts of methylisobutylketone are added. Solids content: 77%.

Example 3

In an apparatus according to Example 1,643.2 parts of trimethylolpropane, 472 parts of 1,6-hexanediol, 758.4 parts of isononaoic acid and 592 parts of phthalic acid anhydride are caused to melt. Then the temperature of the stirred mixture is raised so that the column head temperature will not exceed 100° C. The esterification is continued at a maximum temperature of the reaction mixture of 220° C. until an acid value of 3 is reached. After the mixture has been cooled to 170° C., 460.8 parts of trimellitic acid anhydride are added, and the esterification is continued at 170° C. until an acid value of 33 is reached. After the mixture has been cooled to 100° C., 903.5 parts of methylisobutylketone are added. Solids content: 73.8%.

Example 4

In an apparatus according to Example 1,1664 parts of neopentylglycol are caused to melt. Then 1328 parts of isophthalic acid are added to the stirred melt, and the temperature is raised so that the column head temperature will not exceed 100° C. The esterification is continued at a maximum temperature of the reaction mixture of 220° C. until an acid value of 3 is reached. After the mixture has been cooled to 170° C., 768 parts of trimellitic acid anhydride are added, and the esterification is continued at 170° C. until an acid value of 33 is reached. After the mixture has been cooled to 100° C., 1442 parts of methylisobutylketone are added. Solids content: 70%.

Example 5

In an apparatus according to Example 1, 1699.2 parts of 1,6-hexanediol are caused to melt. Then 1195.2 parts of isophthalic acid are added to the stirred melt, and the temperature is raised so that the column head temperature will not exceed 100° C. The esterification is continued at a maximum temperature of the reaction mixture of 220° C. until an acid value of 3 is reached. After the mixture has been cooled to 170° C., 345.6 parts of trimellitic acid anhydride and 684 parts of Admerginsëure ® (adduct of maleic acid to conjugated-unsaturated fatty acids) are added, and the esterification is continued at 215° C. until an acid value of 27 is reached. After the mixture has been cooled to 100° C., 1529.5 parts of methylisobutylketone are added. Solids content: 70%.

II.

Preparation of Cross-Linked Polymer Microparticles

Example 6

In a heatable stirred reactor equipped with a thermometer and a reflux condenser or a Claisen head plus a distillation condenser ["distillation bridge"], respectively, weighed amounts of 1050 parts of the polyester resin solution obtained in Example 1 and 482 parts of Setamine US 132 (melamine resin in butanol) are charged and heated to 40° C. While the mixture is stirred and heating is continued, 567.8 parts of a 5% aqueous solution of N,N-dimethylaminoethanol (corresponding to a neutralization of 80% of the acid groups) are added within 10 minutes. Upon completion of the addition, the temperature is 35° C. Now, while heating is further continued, 1521.6 parts of fully desalted water are added within 15 minutes. Upon completion of the addition, the temperature is 55° C. The mixture is further heated to 85° C., after a sample for determining the pH value and viscosity has been taken. The pH is 7.78. For the determination of the viscosity, the sample is first neutralized with N,N-dimethylaminoethanol to a degree of neutralization of 100% and then diluted with butylglycol 1:1. The viscosity value of the clear solution is 14 seconds. The temperature of 85° C. is reached after 30 minutes, and another sample is taken. The viscosity of the still clear solution has increased to 27 seconds. After maintaining the mixture at 85° C. for further 30 minutes, another sample is taken. Upon dilution of the sample (100% neutralized) with butylglycol, a turbid solution is obtained which exhibits a viscosity of 19 seconds. The temperature is continued to be maintained at 85° C., until the viscosity of the neutralized solution in butylglycol is no longer reduced. After 3 hours a value of 14 seconds is reached. Now the resulting dispersion is neutralized with N,N-dimethylaminoethanol to 100%, and the methylisobutylketone is distilled off under vacuum. A stable dispersion is obtained which has a solids content of 35%, a pH of 8.15 and a viscosity of 21 seconds.

Example 7

In a stirred reactor according to Example 6, weighed amounts of 1050 parts of the polyester resin solution obtained in Example 1 and 421.8 parts of Cymel 1158 (butylated resin containing NH groups, in butanol) are charged and heated to 40° C. While the mixture is stirred and heating is continued, 567.8 parts of a 5% aqueous solution of N,N-dimethylaminoethanol (corresponding to a neutralization of 80% of the acid groups) are added within 10 minutes. Upon completion of the addition, the temperature is 35° C. Now, while heating is further continued, 1521.6 parts of fully desalted water are added within 15 minutes. Upon completion of the addition, the temperature is 54° C. The mixture is further heated to 85° C., after a sample for determining the pH value and viscosity has been taken. The pH is 7.78. For the determination of the viscosity, the sample is first neutralized with N,N-dimethylaminoethanol to a degree of neutralization of 100% and then diluted with butylglycol 1:1. The viscosity value of the clear solution is 14 seconds. The temperature of 85° C. is reached after 30 minutes, and another sample is taken. The viscosity of the still clear solution has increased to 28 seconds. After maintaining the mixture at 85° C. for further 30 minutes, another sample is taken. Upon dilution of the sample (100% neutralized) with butylglycol, a turbid solution is obtained which exhibits a viscosity of 20 seconds. The temperature is continued to be maintained at 85° C., until the viscosity of the neutralized solution in butylglycol is no longer reduced. After 3 hours a value of 15 seconds is reached. Now the resulting dispersion is neutralized with N,N-dimethylaminoethanol to .100%, and the methylisobutylketone is distilled off under vacuum. A stable dispersion is obtained which has a solids content of 35%, a pH of 8.48 and a viscosity of 20 seconds.

Example 8

In a stirred reactor according to Example 6, weighed amounts of 1050 parts of the polyester resin solution obtained in Example 1 and 613.6 parts of Maprenal MF 650 (non-plasticized isobutyl-etherified melamine-formaldehyde resin in isobutanol) are charged and heated to 40° C. While the mixture is stirred and heating is continued, 567.8 parts of a 5% aqueous solution of N,N-dimethylaminoethanol (corresponding to a neutralization of 80% of the acid groups) are added within 10 minutes. Upon completion of the addition, the temperature is 35° C. Now, while heating is further continued, 1521.6 parts of fully desalted water are added within 15 minutes. Upon completion of the addition, the temperature is 55° C. The mixture is further heated to 85° C., after a sample for determining the pH value and viscosity has been taken. The pH is 7.87. For the determination of the viscosity, the sample is first neutralized with N,N-dimethylaminoethanol to a degree of neutralization of 100% and then diluted with butylglycol 1:1. The viscosity value of the clear solution is 13 seconds. The temperature of 85° C. is reached after 30 minutes, and another sample is taken. The viscosity of the still clear solution has increased to 27 seconds. After maintaining the mixture at 85° C. for further 30 minutes, another sample is taken. Upon dilution of the sample (100% neutralized) with butylglycol, a turbid solution is obtained which exhibits a viscosity of 21 seconds. The temperature is continued to be maintained at 85° C., until the viscosity of the neutralized solution in butylglycol is no longer reduced. After 3 hours a value of 16 seconds is reached. Now the resulting dispersion is neutralized with N,N-dimethylaminoethanol to 100%, and the methylisobutylketone is distilled off under vacuum. A stable dispersion is obtained which has a solids content of 33%, a pH of 8.19 and a viscosity of 21 seconds.

Example 9

In a stirred reactor according to Example 6, weighed amounts of 1050 parts of the polyester resin solution obtained in Example 2 and 495 parts of Setamine Us132 (melamine resin in butanol) are charged and heated to 40° C. While the mixture is stirred and heating is continued, 687.5 parts of a 5% aqueous solution of N,N-dimethylaminoethanol (corresponding to a neutralization of 80% of the acid groups) are added within 10 minutes. Upon completion of the addition, the temperature is 48° C. Now, while heating is further continued, 1457.5 parts of fully desalted water are added within 15 minutes. Upon completion of the addition, the temperature is 68° C. The mixture is further heated to 85° C., after a sample for determining the pH value and viscosity has been taken. The pH is 7.78. For the determination of the viscosity, the sample is first neutralized with N,N-dimethylaminoethanol to a degree of neutralization of 100% and then diluted with butylglycol 1:1. The viscosity value of the clear solution is 13 seconds. The temperature of 85° C. is reached after 30 minutes, and another sample is taken. The viscosity of the solution which is already slightly turbid has increased to 16 seconds. After maintaining the mixture at 85° C. for further 30 minutes, another sample is taken. Upon dilution of the sample (100% neutralized) with butylglycol, a turbid solution is obtained which exhibits a viscosity of 15 seconds. The temperature is continued to be maintained at 85° C., until the viscosity of the neutralized solution in butylglycol is no longer reduced. After 3 hours a value of 14 seconds is reached. Now the resulting dispersion is neutralized with N, N-dimethylaminoethanol to 100% and the methylisobutylketone is distilled off under vacuum. A stable dispersion is obtained which has a solids content of 34%, a pH of 8.37 and a viscosity of 21 seconds.

Example 10

In a stirred reactor according to Example 6, equipped with a thermometer and a reflux condenser or a Claisen head plus a distillation condenser ["distillation bridge"], respectively, weighed amounts of 1070 parts of the polyester resin solution obtained in Example 1 and 483.5 parts of Setamine US132 (melamine resin in butanol) are charged and heated to 40° C. While the mixture is stirred and heating is continued, 653.4 parts of a 5% aqueous solution of N,N-dimethylaminoethanol (corresponding to a neutralization of 80% of the acid groups) are added within 10 minutes. Upon completion of the addition, the temperature is 40° C. Now, while heating is further continued, 1441.6 parts of fully desalted water are added within 15 minutes. Upon completion of the addition, the temperature is 44° C. The mixture is further heated to 85° C., after a sample for determining the pH value and viscosity has been taken. The pH is 7.68.

For the determination of the viscosity, the sample is first neutralized with N,N-dimethylaminoethanol to a degree of neutralization of 100% and then diluted with butylglycol 1:1. The viscosity value of the clear solution is 13 seconds. The temperature of 85° C. is reached after 30 minutes, and another sample is taken. The viscosity of the still clear solution has increased to 55 seconds. After maintaining the mixture at 85° C. for further 30 minutes, another sample is taken. Upon dilution of the sample (100% neutralized) with butylglycol, a turbid solution is obtained which exhibits a viscosity of 35 seconds. The temperature is continued to be maintained at 85° C., until the viscosity of the neutralized solution in butylglycol is no longer reduced. After 3 hours a value of 17 seconds is reached. Now the resulting dispersion is neutralized with N,N-dimethylaminoethanol to 100%, and the methylisobutylketone is distilled off under vacuum. A stable dispersion is obtained which has a solids content of 35%, a pH of 8.45 and a viscosity of 48 seconds.

Example 11

In a stirred reactor according to Example 6, weighed amounts of 1100 parts of the polyester resin solution obtained in Example 4 and 597 parts of Setamine US132 (melamine resin in butanol) are charged and heated to 40° C. While the mixture is stirred and heating is continued, 626 parts of a 5% aqueous solution of N,N-dimethylaminoethanol (corresponding to a neutralization of 75% of the acid groups) are added within 10 minutes. Upon completion of the addition, the temperature is 35° C. Now, while heating is further continued, 1590 parts of fully desalted water are added within 15 minutes. Upon completion of the addition, the temperature is 55° C. The mixture is further heated to 85° C., after a sample for determining the pH value and viscosity has been taken. The pH is 7.74. For the determination of the viscosity, the sample is first neutralized with N,N-dimethylaminoethanol to a degree of neutralization of 100% and then diluted with butylglycol 1:1. The viscosity value of the clear solution is 14 seconds. The temperature of 85° C. is reached after 30 minutes, and another sample is taken. The viscosity of the still clear solution has increased to 27 seconds. After maintaining the mixture at 85° C. for further 30 minutes, another sample is taken. Upon dilution of the sample (100% neutralized) with butylglycol, a turbid solution is obtained which exhibits a viscosity of 18 seconds. The temperature is continued to be maintained at 85° C., until the viscosity of the neutralized solution in butylglycol is no longer reduced. After 3 hours a value of 14 seconds is reached. Now the resulting dispersion is neutralized with N,N-dimethylaminoethanol to 100%, and the methylisobutylketone is distilled off under vacuum. A stable dispersion is obtained which has a solids content of 32%, a pH of 8.15 and a viscosity of 19 seconds.

Example 12

In a stirred reactor according to Example 6, weighed amounts of 950 parts of the polyester resin solution obtained in Example 2 and 635.5 parts of Cymel 1158 (butylated resin containing NH groups, in butanol) are charged and heated to 40° C. While the mixture is stirred and heating is continued, 672.8 parts of a 5% aqueous solution of N,N-dimethylaminoethanol (corresponding to a neutralization of 80% of the acid groups) are added within 10 minutes. Upon completion of the addition, the temperature is 48° C. Now, while heating is further continued, 1689.9 parts of fully desalted water are added within 15 minutes. Upon completion of the addition, the temperature is 68° C. The mixture is further heated to 85° C., after a sample for determining the pH value and viscosity has been taken. The pH is 7.52. For the determination of the viscosity, the sample is first neutralized with N,N-dimethylaminoethanol to a degree of neutralization of 100% and then diluted with butylglycol 1:1. The viscosity value of the clear solution is 13 seconds. The temperature of 85° C. is reached after 30 minutes, and another sample is taken. The viscosity of the solution which is already slightly turbid has increased to 14 seconds. After maintaining the mixture at 85° C. for further 30 minutes, another sample is taken. Upon dilution of the sample (100% neutralized) with butylglycol, a turbid solution is obtained which exhibits a viscosity of 15 seconds. The temperature is continued to be maintained at 85° C., until the viscosity of the neutralized solution in butylglycol is no longer reduced. After 3 hours a value of 13 seconds is reached. Now the resulting dispersion is neutralized with N,N-dimethylaminoethanol to 100%, and the methylisobutylketone is distilled off under vacuum. A stable dispersion is obtained which has a solids content of 31%, a pH of 8.52 and a viscosity of 21 seconds.

Example 13

In a stirred reactor according to Example 6, weighed amounts of 1100 parts of the polyester resin solution obtained in Example 1 and. 392.9 parts of Cymel 327 (highly methylated melamine-formaldehyde resin, in isobutanol) are charged and heated to 40° C. While the mixture is stirred and heating is continued, 446 parts of a 5% aqueous solution of N,N-dimethylaminoethanol (corresponding to a neutralization of 60% of the acid groups) are added within 10 minutes. Upon completion of the addition, the temperature is 40° C. Now, while heating is further continued, 1742.8 parts of fully desalted water are added within 15 minutes. Upon completion of the addition, the temperature is 45° C. The mixture is further heated to 85° C., after a sample for determining the pH value and viscosity has been taken. The pH is 7.10. For the determination of the viscosity, the sample is first neutralized with N,N-dimethylaminoethanol to a degree of neutralization of 100% and then diluted with butylglycol 1:1. The viscosity value of the clear solution is 13 seconds. The temperature of 85° C. is reached after 30 minutes, and another sample is taken. The viscosity of the solution, which is already slightly turbid, has increased to 18 seconds. After maintaining the mixture at 85° C. for further 30 minutes, another sample is taken. Upon dilution of the sample (100% neutralized) with butylglycol, a turbid solution is obtained which exhibits a viscosity of 14 seconds. The temperature is continued to be maintained at 85° C., until the viscosity of the neutralized solution in butylglycol is no longer reduced. After 3 hours a value of 13 seconds is reached. Now the resulting dispersion is neutralized with N,N-dimethylaminoethanol to 100%, and the methylisobutylketone is distilled off under vacuum. A stable dispersion is obtained which has a solids content of 36%, a pH of 8.65 and a viscosity of 12 seconds.

Example 14

In a stirred reactor according to Example 6, weighed amounts of 1200 parts of the polyester resin solution obtained in Example 5 and 404 parts of Cymel 327

(highly methylated melamine-formaldehyde resin, in isobutanol) are charged and heated to 40° C. While the mixture is stirred and heating is continued, 486.2 parts of a 5% aqueous solution of N,N-dimethylaminoethanol (corresponding to a neutralization of 80% of the acid groups) are added within 10 minutes. Upon completion of the addition, the temperature is 35° C. Now, while heating is further continued, 1764.7 parts of fully desalted water are added within 15 minutes. Upon completion of the addition, the temperature is 55° C. The mixture is further heated to 85° C., after a sample for determining the pH value and viscosity has been taken. The pH is 7.98. For the determination of the viscosity, the sample is first neutralized with N,N-dimethylaminoethanol to a degree of neutralization of 100% and then diluted with butylglycol 1:1. The viscosity value of the clear solution is 13 seconds. The temperature of 85° C. is reached after 30 minutes, and another sample is taken. The viscosity of the still clear solution has increased to 15 seconds. After maintaining the mixture at 85° C. for further 30 minutes, another sample is taken. Upon dilution of the sample (100% neutralized) with butylglycol, a turbid solution is obtained which exhibits a viscosity of 20 seconds. The temperature is continued to be maintained at 85° C., until the viscosity of the neutralized solution in butylglycol is no longer reduced. After 3 hours a value of 15 seconds is reached. Now the resulting dispersion is neutralized with N,N-dimethylaminoethanol to .100%, and the methylisobutylketone is distilled off under vacuum. A stable dispersion is obtained which has a solids content of 35%, a pH of 8.85 and a viscosity of 21 seconds.

III.

Application Examples

Example 15

Transferring the Polymer Microparticles into an Organic Phase

A heatable stirred reactor equipped with a thermometer, a reflux condenser or a Claisen head plus a distillation condenser ["distillation bridge"], respectively, and a bottom discharge valve, is charged with 2615 parts of the dispersion obtained in Example 11 together with 800 parts of fully desalted water. Thereto, 990 parts of xylene and 810 parts of n-butanol are added and admixed with stirring. To the resulting stirred mixture, 29 parts of maleic acids, dissolved in 56 parts of water, are added. After intensely mixing for 20 minutes, the stirrer is stopped, and the mixture is left sitting, until phase separation has been completed. After 45 minutes, the lower phase mainly consisting of water is discharged (2650 ml). The mixture is heated to 60° C., and the residual water is distilled off under vacuum. A non-aqueous stable dispersion of cross-linked polymer microparticles is obtained which dispersion is highly viscous at room temperature and has a solids content of 40%.

Example 16

Coating Composition 56 parts by weight of the dispersion described in Example 9 are admixed with 23 parts by weight of a thickener dispersion. There is used, as the thickener, Latekoll D (thickener based on acrylic ester-methacrylic acid having a solids content of 25%) which has been diluted with water to a solids content of 3% and has been adjusted to a pH value of 7.0 with dimethylethanolamine.

In a separate vessel, 4.5 parts by weight of a commercially available non-leafing aluminum bronze having an aluminum content of 65% was made into a paste with 5 parts by weight of butylglycol and digested in the usual manner.

This aluminum slurry is added to the stirred dispersion as described above. After the pH value has been adjusted to 8.0 with a 10% aqueous dimethylethanolamine solution (about 0.6 parts by weight), the viscosity is adjusted with water (about 10 parts by weight) to a value of 40 seconds. The solids content is 23%.

The base coating composition thus obtained is sprayed onto a steel sheet coated with a filler in a conventional manner and is allowed to dry at 50° C. for 5 minutes. Then a commercially available baking enamel based on polyacrylate/melamine resin is sprayed over said base coating and baked at 130° C. for 30 minutes. The coating thus obtained exhibits a high brilliance and a uniform marked metallic effect.

It is claimed:

1. An aqueous coating dispersion of cross-linked polymer microparticles, said polymer microparticles being prepared at an elevated temperature in an aqueous medium from two components, (A) and (B), the ratio by weight of component (A) to component (B) being between 30:70 and 95:5, wherein A. component (A) is a polymer, optionally dissolved in an organic solvent, said polymer bearing at least two hydroxyl groups and comprising a number of ionic groups sufficient for the formation of a stable aqueous dispersion, said polymer comprising a polyesterpolyol having an acid value between 20 and 50, said polyesterpolyol being prepared from one or more polyol(s) selected from the group consisting of: ethylene glycol, 1,2- and 1,3-propanediol, 1,3- and 1,4-butanediol, the isomeric pentanediols, hexanediols or octanediols (e.g., 2-ethyl-1,3-hexanediol), trimethylolpropane, neopentyl glycol, glycerol, bishydroxymethyl cyclohexane, erythritol, mesoerythritol, arabitol, adonitol, xylitol, mannitol, sorbitol, dulcitol, hexanetriol, and (poly-)pentaerythritol, by reaction with one or more polycarboxylic acid or anhydrides thereof—so far as said anhydrides exist—having from 2–18 carbon atoms, wherein said polycarboxylic acids and/or anhydrides may be employed individually or in admixtures thereof; and component (B) is an aminoplast resin consisting of molecules containing at least two reactive groups consisting of hydroxyl and/or amino an/or ether groups;

the aqueous dispersion of cross-linked microparticles being stable.

2. The dispersion according to claim 1, characterized in that methylolated melamine resins are employed as the component (B).

3. The dispersion according to claims 1 or 2, characterized in that the ratio by weight of component (A) to component (B) is between 60:40 and 80:20.

4. The dispersion according to claims 1 or 2, characterized in that the component (B) is added into the solution of the component (A) in an organic solvent or solvent mixture, the mixture is neutralized to a degree of from 70% to 90%, and preferably of 80%, with an aqueous solution of an amine, and the resulting mixture is heated to a temperature of from 50° C. to 100° C., and preferably from 70° C. to 90° C., to reach a constant viscosity, and then is neutralized up to 100% with the amine.

5. The dispersion according to claims 1 or 2, characterized in that the organic solvent or solvent mixture is distilled off after the complete neutralization.

6. A process for producing an aqueous coating dispersion of cross-linked polymer microparticles, said process comprising reacting two components, component (A) and component (B) by:
   (a) adding component (B) into a solution of component (A) in an organic solvent or solvent mixture, the ratio by weight of component (A) to component (B) being between 30:70 and 95:5;
   (b) at least partially, neutralizing the mixture;
   (c) heating the mixture in an aqueous medium wherein
      1. component (a) is a polymer optionally dissolved in an organic solvent, said polymer bearing at least two hydroxyl groups and comprising a number of ionic groups sufficient for the formation of a stable aqueous dispersion, said polymer comprising a polyesterpolyol having an acid value between 20 and 50, said polyesterpolyol being prepared from one or more polyol(s) selected from the group consisting of: ethylene glycol, 1,2- and 1,3-propanediol, 1,3- and 1,4-butanediol, the isomeric pentanediols, hexanediols or octanediols (e.g., 2-ethyl-1, 3-hexanediol), trimethylolpropane, neopentyl glycol, glycerol, bishydroxymethyl cyclohexane, erythritol, mesoerythritol, arabitol, adonitol, xylitol, mannitol, sorbitol, dulcitol, hexanetriol, and (poly-)pentaerythritol, by reaction with polycarboxylic acid or anhydrides thereof—so far as said anhydrides exist—having from 2-18 carbon atoms, wherein said polycarboxylic acids and/or anhydrides may be employed individually or in admixtures thereof; and
      2. component (B) is an aminoplast resin consisting of molecules containing at least two reactive groups consisting of hydroxyl and/or amino and/or ether groups;
   (d) obtaining a stable aqueous dispersion of cross-linked microparticles.

7. The process according to claim 6, characterized in that methylolated melamine resins are employed as the component (B).

8. The process according to claims 6 or 7, characterized in that the ratio by weight of component (A) to component (B) is between 60:40 and 80:20.

9. The process according to claims 6 or 7, characterized in that the component (B) is added into the solution of the component (A) in an organic solvent or solvent mixture, the mixture is neutralized to a degree of from 70% to 90%, and preferably of 80%, with an aqueous solution of an amine, and the resulting mixture is heated to a temperature of from 50° C. to 100° C., and preferably from 70° C. to 90° C., to reach a constant viscosity, and then is neutralized up to 100% with the amine.

10. The process according to claim 9 comprising:
    after said step of neutralizing said reacted mixture up to 100%, conducting a distillation to volatilize and remove said organic solvent or solvent mixture.

11. A coating composition consisting of a dispersion of cross-linked polymer microparticles, said polymer microparticles being prepared at an elevated temperature in an aqueous medium from two components, (A) and (B), the ratio by weight of component (A) to component (B) being between 30:70 and 95:5, said medium optionally containing still further film-forming material, pigments and further conventional additives, and being particularly suitable for producing protective and/or decorative coatings, wherein
    A. component (A) is a polymer, optionally dissolved in an organic solvent, said polymer bearing at least two hydroxyl groups and comprising a number of ionic groups sufficient for the formation of a stable aqueous dispersion, said polymer comprising a polyesterpolyol having an acid value between 20 and 50, said polyesterpolyol being prepared from one or more polyol(s) selected from the group consisting of: ethylene glycol, 1,2- and 1,3-propanediol, 1,3- and 1,4-butanediol, the isomeric pentanediols, hexanediols or octanediols (e.g., 2-ethyl-1,3hexanediol), trimethylolpropane, neopentyl glycol, glycerol, bishydroxymethyl cyclohexane, erythritol, mesoerythritol, arabitol, adonitol, xylitol, mannitol, sorbitol, dulcitol, hexanetriol, and (poly-)pentaerythritol, by reaction with polycarboxylic acid or anhydrides thereof—so far as said anhydrides exist—having from 2-18 carbon atoms, wherein said polycarboxylic acids and/or anhydrides thereof may be employed individually or in admixtures thereof; and component (B) is an aminoplast resin consisting of molecules containing at least two reactive groups consisting of hydroxyl and/or amino and/or ether groups,
    the aqueous dispersion of cross-linked microparticles being stable.

12. The coating composition according to claim 11, characterized in that it contains metal pigment particles, and especially aluminum pigment particles.

13. A coating composition comprising a binder or thickener, said binder or thickener comprising the aqueous dispersion of claim 1 or claim 2.

* * * * *

UNITED STATES PATENT AND TRADEMARK OFFICE
CERTIFICATE OF CORRECTION

PATENT NO.   : 5,412,023

DATED        : May 2, 1995

INVENTOR(S)  : Hans Dieter-Hille et al.

It is certified that error appears in the above-identified patent and that said Letters Patent is hereby corrected as shown below:

Col. 3, line 50, delete "CA)" and insert --(A)--.

Col. 7, line 39, delete "1,670", and insert --1, 670--.

Col. 7, line 55, delete "1,643.2" and insert --1, 643.2--.

Col. 8, line 1, delete "1,1664" and insert --1, 1664--.

Col. 9, line 39, delete ".100%" and insert --100%--.

Col. 13, line 29, delete ".100%" and insert --100%--.

Col. 15, claim 6, line 13, after "polymer" insert --,--.

Signed and Sealed this

Eleventh Day of June, 1996

BRUCE LEHMAN

Attest:

*Attesting Officer*        Commissioner of Patents and Trademarks